(12) United States Patent
Lee et al.

(10) Patent No.: US 10,836,331 B1
(45) Date of Patent: Nov. 17, 2020

(54) CUSTOMIZABLE LICENSE PLATE HOLDER

(71) Applicants: Alejandro C. Lee, Plantation, FL (US); Alex Jordan Lee, Plantation, FL (US)

(72) Inventors: Alejandro C. Lee, Plantation, FL (US); Alex Jordan Lee, Plantation, FL (US)

( * ) Notice: Subject to any disclaimer, the term of this patent is extended or adjusted under 35 U.S.C. 154(b) by 0 days.

(21) Appl. No.: 16/201,696

(22) Filed: Nov. 27, 2018

Related U.S. Application Data

(60) Provisional application No. 62/591,706, filed on Nov. 28, 2017.

(51) Int. Cl.
*B60R 13/10* (2006.01)
*G09F 7/18* (2006.01)

(52) U.S. Cl.
CPC ............. *B60R 13/105* (2013.01); *G09F 7/18* (2013.01); *G09F 2007/1895* (2013.01)

(58) Field of Classification Search
CPC .. B60R 13/105; G09F 7/18; G09F 2007/1895
See application file for complete search history.

(56) References Cited

U.S. PATENT DOCUMENTS

| | | | | |
|---|---|---|---|---|
| 2,341,773 A | * | 2/1944 | Hanson | G09F 3/12 40/1.5 |
| 2,384,274 A | * | 9/1945 | Bean | A45C 11/18 40/661.04 |
| 5,360,639 A | * | 11/1994 | Kawabata | B05D 3/12 427/270 |
| 5,381,618 A | * | 1/1995 | Singleton | G09F 7/18 248/551 |
| 6,385,876 B1 | * | 5/2002 | Mc Kenzie | B60R 13/10 40/201 |
| 6,519,882 B1 | * | 2/2003 | Shuen | G09F 7/18 40/200 |
| 6,892,483 B2 | * | 5/2005 | Parenti | B60R 13/105 40/201 |
| D591,660 S | * | 5/2009 | Kazaryan | D12/193 |
| 7,713,012 B2 | * | 5/2010 | Coonjohn | B60R 11/00 411/372.6 |
| 7,836,618 B1 | * | 11/2010 | Parenti | B60R 13/105 40/201 |
| 7,905,036 B2 | * | 3/2011 | Howell | G09F 3/207 40/1.5 |
| 8,281,508 B1 | * | 10/2012 | Wiskow | B60R 13/105 40/209 |
| 8,291,627 B1 | * | 10/2012 | Spencer | B60R 13/005 40/209 |
| 8,938,896 B2 | * | 1/2015 | Spencer | A47G 3/00 40/209 |
| 2003/0079381 A1 | * | 5/2003 | Arens | B60R 13/005 40/210 |

(Continued)

*Primary Examiner* — Cassandra Davis
(74) *Attorney, Agent, or Firm* — John Rizvi; John Riziv, P.A.—The Patent Professor

(57) ABSTRACT

A customizable license plate holder for a vehicle license plate is provided, which includes a holder frame that is securable to a vehicle and configured to register with a vehicle license plate. The holder frame has a front frame plate. At least one plate window is provided in the front frame plate. The at least one plate window is configured to register with license plate indicia on the vehicle license plate. At least one decorative element is affixed to the front frame plate. The decorative elements are preferably detachable from the front frame plate.

6 Claims, 11 Drawing Sheets

(56) References Cited

U.S. PATENT DOCUMENTS

| | | | |
|---|---|---|---|
| 2009/0126248 A1* | 5/2009 | Burnstein | G02C 11/02 40/799 |
| 2015/0308484 A1* | 10/2015 | Dubowski | F16B 23/00 411/372.6 |
| 2016/0114741 A1* | 4/2016 | Dudley | B60R 13/105 40/209 |
| 2019/0077338 A1* | 3/2019 | Urbanczyk, II | G09F 7/10 |
| 2020/0122635 A1* | 4/2020 | Kidakarn | G09F 21/04 |

* cited by examiner

CUSTOMIZABLE LICENSE PLATE HOLDER

This application claims the benefit of U.S. Patent Application Ser. No. 62/591,706, filed on Nov. 28, 2017, which is incorporated by reference herein in its entirety.

FIELD OF THE INVENTION

The present invention relates generally to vehicle license plates, and more particularly, to a customizable license plate holder that holds a vehicle license plate, is securable to a vehicle and includes one or more decorations which are attached to the license plate holder.

BACKGROUND OF THE INVENTION

Personalization of items in a variety of contexts is common. For example, a person may monogram towels or handkerchiefs with his or her initials. Other items such as belts, purses or wallets may be emblazoned or embroidered with the initials of the owner.

Motor vehicles are commonly customized according to the likes or tastes and interest of the vehicle owner. For example, a vehicle owner may apply a bumper sticker to the rear bumper to his or her vehicle. The bumper sticker may display a slogan, pictorial representation or organization about which the vehicle owner is enthusiastic. Other vehicle owners may place stickers against the interior surface of the rear vehicle window for viewing by the operator of a vehicle behind the owner's vehicle.

Jurisdictions in the United States and around the world require that license plates be affixed to motor vehicles which are registered in those jurisdictions for the purpose of identifying the vehicles. License plates typically include identifying indicia typically having a combination of letters and/or numbers. In the United States, the license plate is typically mounted on the rear of the motor vehicle using a rectangular frame having a central frame opening through which the identifying indicia can be viewed by operators of approaching vehicles. Owners of motor vehicles may additionally attach a decorative plate, also known as a vanity plate, to the front of the vehicle for decorative purposes.

Some vehicle owners may decorate the license plate or the mounting frame that surrounds the license plate. License plate frames are highly-customizable and commonly reflect a sports team, college, university or other organization with which the owner or driver of the motor vehicle is affiliated. However, customizable license plates, license plate frames and vanity plates are typically limited to words or logos which may be embossed or otherwise applied to the plate or frame. Additionally, only one or two items typically may be applied to the plates.

Accordingly, there is an established need for a customizable license plate holder for safely and stably holding a vehicle license plate while being secured to a vehicle, wherein the customizable license plate holder solves at least one of the aforementioned problems.

SUMMARY OF THE INVENTION

The present invention is directed to a customizable license plate holder that holds a vehicle license plate, is securable to a vehicle and includes various decorations which are attached to the license plate holder. The customizable license plate holder includes a holder frame. The holder frame may include a front frame plate. A vehicle license plate on which is provided license plate identifying indicia may be place adjacent to and in registration with the holder frame. At least one plate window may extend through the front frame plate. The at least one plate window may register to the position or positions of the license plate indicia on the license plate such that the license plate indicia is visible through the plate window or windows. At least one decorative element may be removably affixed to the front frame plate. In some embodiments, at least one decoration mount opening may be provided in the front frame plate. The at least one decorative element may detachably engage the at least one decoration mount opening to enable an owner or driver of the motor vehicle to customize the appearance of the customizable license plate holder.

Introducing a first illustrative embodiment of the invention, the present invention includes a customizable license plate holder that holds a vehicle license plate, is securable to a vehicle and includes various decorations which are attached to the license plate holder, comprising:

a holder frame securable to a vehicle, the holder frame configured to register with a vehicle license plate having license plate indicia;

at least one plate window in the holder frame, the at least one plate window configured to register with the license plate indicia on the vehicle license plate when the vehicle license plate is registered with the holder frame; and at least one decorative element removably affixed to the holder frame.

In a second aspect, the holder frame can include a frame interior configured to removably receive the vehicle license plate, and the at least one plate window can be configured to register with the license plate indicia on the vehicle license plate when the vehicle license plate is received in the frame interior.

In another aspect, the holder frame can include a front frame plate arrangeable in front of the vehicle license plate when the holder frame is secured to a vehicle.

In another aspect, at least one decoration mount opening may be provided in the front frame plate of the holder frame, and the at least one decorative element may detachably engage the at least one decoration mount opening.

In another aspect, the at least one decorative element may include a decoration mount clip which snaps into the decoration mount opening.

In another aspect, one or more plate windows of the at least one plate window may be provided in the front frame plate.

In another aspect, the holder frame can further include a rear frame plate, wherein the frame interior is formed by and between the front frame plate and the rear frame plate.

In another aspect, at least one decoration mount opening may be provided in the rear frame plate of the holder frame, and the at least one decorative element may detachably engage the at least one decoration mount opening.

In another aspect, the at least one decorative element may include a decoration mount clip which snaps into the decoration mount opening.

In another aspect, the holder frame can further include at least one license plate insertion slot between the front frame plate and the rear frame plate and communicating with the frame interior. The at least one license plate insertion slot can be configured to receive the vehicle license plate.

In another aspect, one or more plate windows of the at least one plate window may be provided in the rear frame plate.

In another aspect, the holder frame can be reversibly securable to a vehicle, such that the holder frame is mountable in a first orientation with the front frame plate oriented outwards of the vehicle and the rear frame plate oriented towards the vehicle, and an opposite, second orientation with the front frame plate oriented towards the vehicle and the rear frame plate oriented outwards of the vehicle.

In still another aspect, the at least one plate window may include a center plate window and a pair of side plate windows.

In a further aspect, the at least one plate window may include two or more plate windows having different sizes and/or shapes.

In another aspect, the at least one plate window may consist of a single plate window.

In a still further aspect, the at least one decorative element may be approximately 2 inches in width or diameter.

In yet another aspect, the at least one decorative element can include a plurality of decorative elements removably affixed to the holder frame around the perimeter of the holder frame.

In another aspect, the holder frame may include one or more openings configured to register with one or more openings formed in the motor vehicle for the insertion of one or more respective fasteners therethrough to secure the holder frame to the motor vehicle.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a customizable license plate holder that holds a vehicle license plate, is securable to a vehicle and includes one or more decorations which are attached to the license plate holder.

Figure 3:
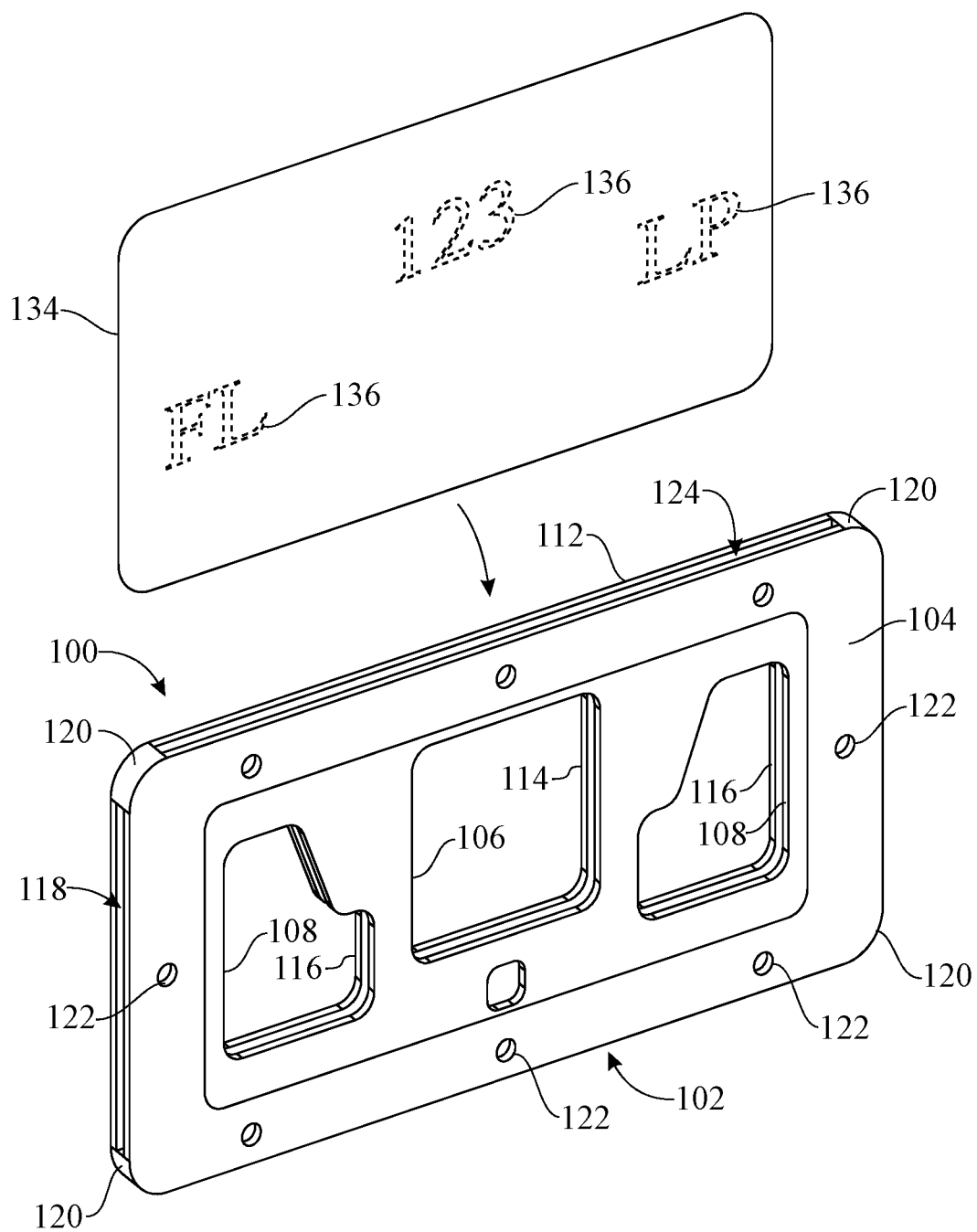
FIG. 3 presents a top front exploded isometric view of the customizable license plate holder of in FIG. 1, more particularly illustrating typical placement of a license plate in the license plate holder.
Figure 4:
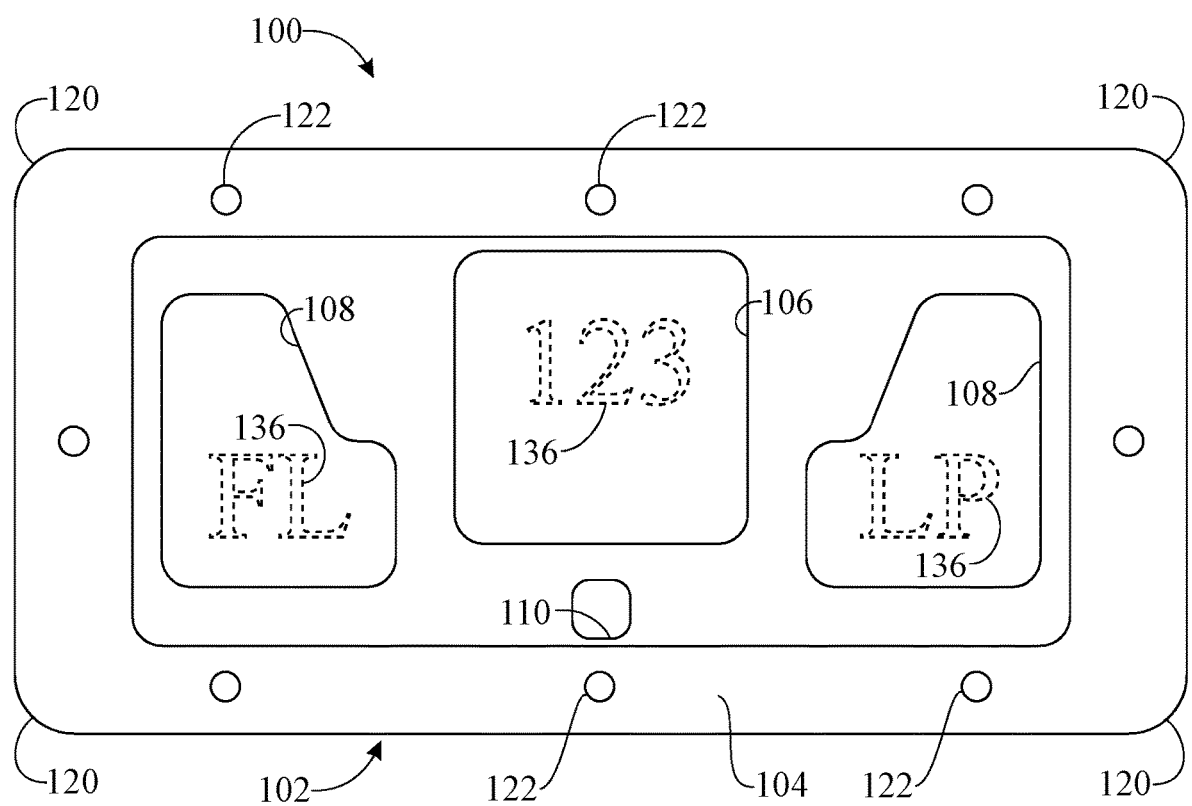
FIG. 4 presents a front elevation view of the license plate holder and license plate illustrated in FIG. 3, with license plate indicia on the license plate visible through the plate openings in the front frame plate.
Figure 5:
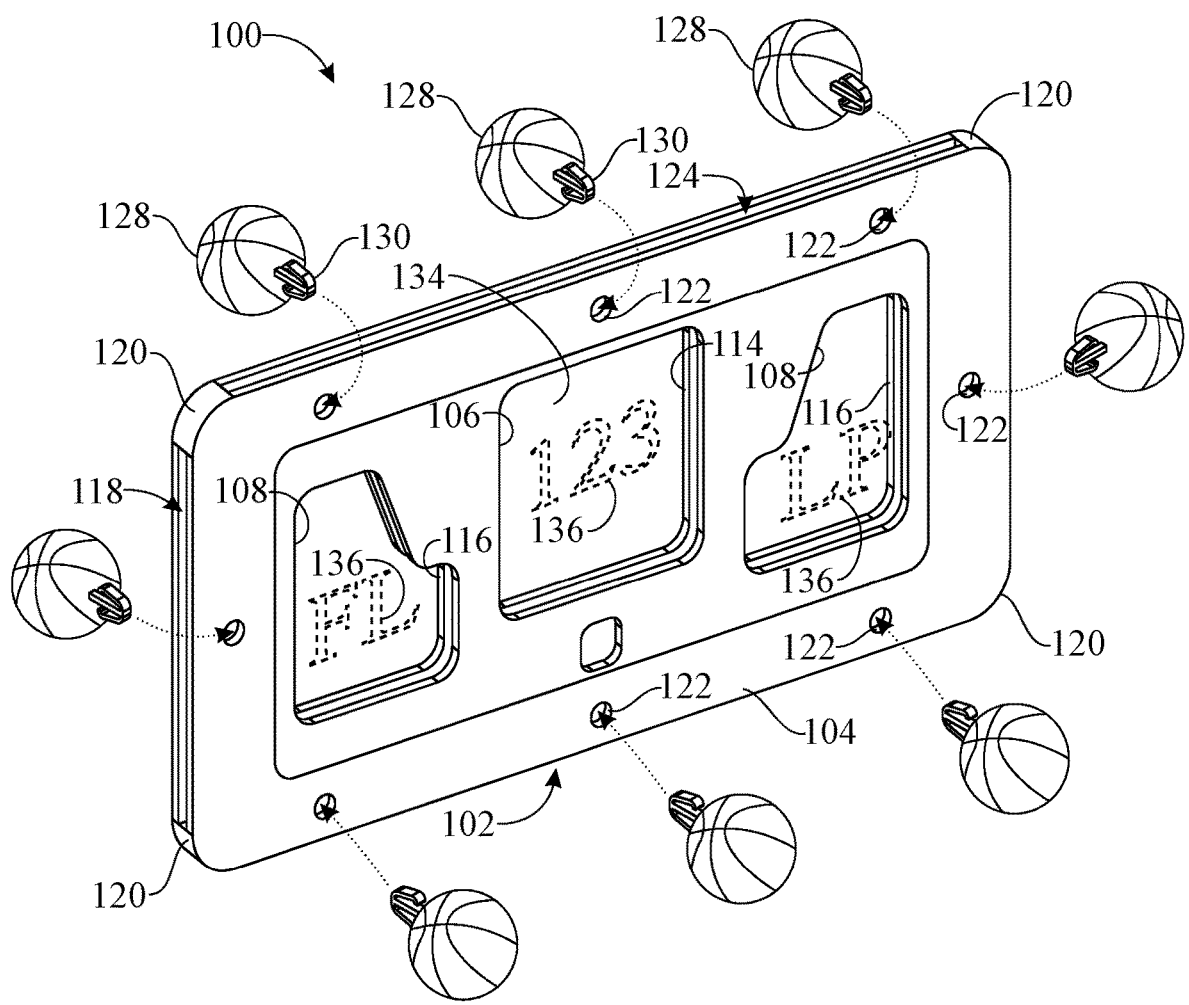
FIG. 5 presents a top front exploded isometric view of the license plate holder and license plate of FIG. 4, more particularly illustrating typical attachment of decorative elements to the license plate holder.
Figure 6:
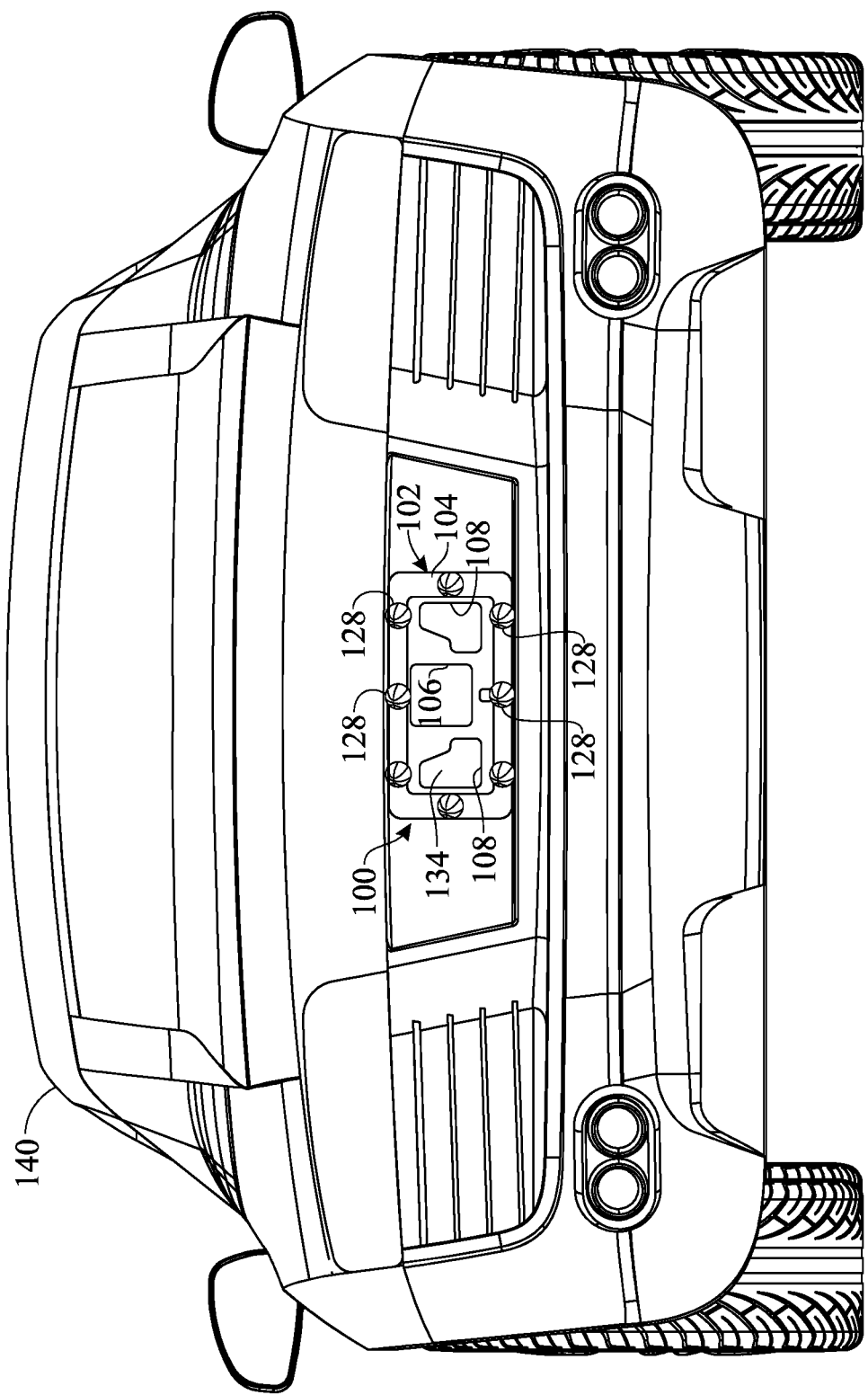
FIG. 6 presents an elevation view of a motor vehicle with the customizable license plate holder mounted on the rear end of the vehicle.

Referring initially to FIGS. 1-6, a customizable license plate holder 100 in accordance with a first illustrative embodiment of the invention is illustrated. As shown in FIG. 6, the customizable license plate holder 100 is securable to a motor vehicle 140 and, as better shown in FIGS. 3 and 4, holds a vehicle license plate 134 having license plate indicia 136 which identifies the motor vehicle 140. The customizable license plate holder 100 may include various decorations or decorative elements 128, examples of which are depicted in FIG. 5, which may be detachably attachable to the customizable license plate holder 100 without obstructing the view of the license plate indicia 136.

Figure 1:
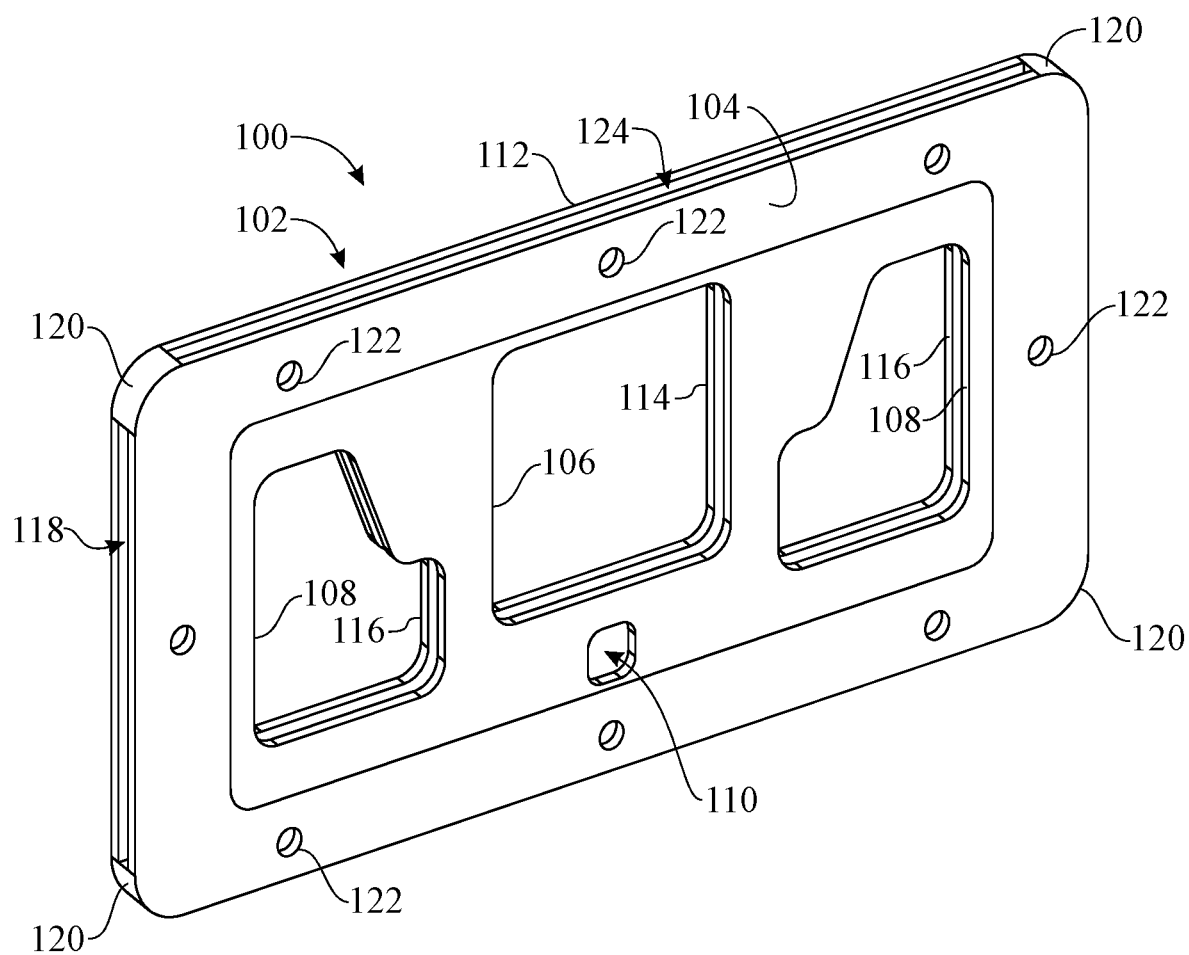
FIG. 1 presents a top front isometric view showing a customizable license plate holder in accordance with a first illustrative embodiment of the present invention, with decorative elements (not illustrated) removed from the license plate holder.
Figure 2:
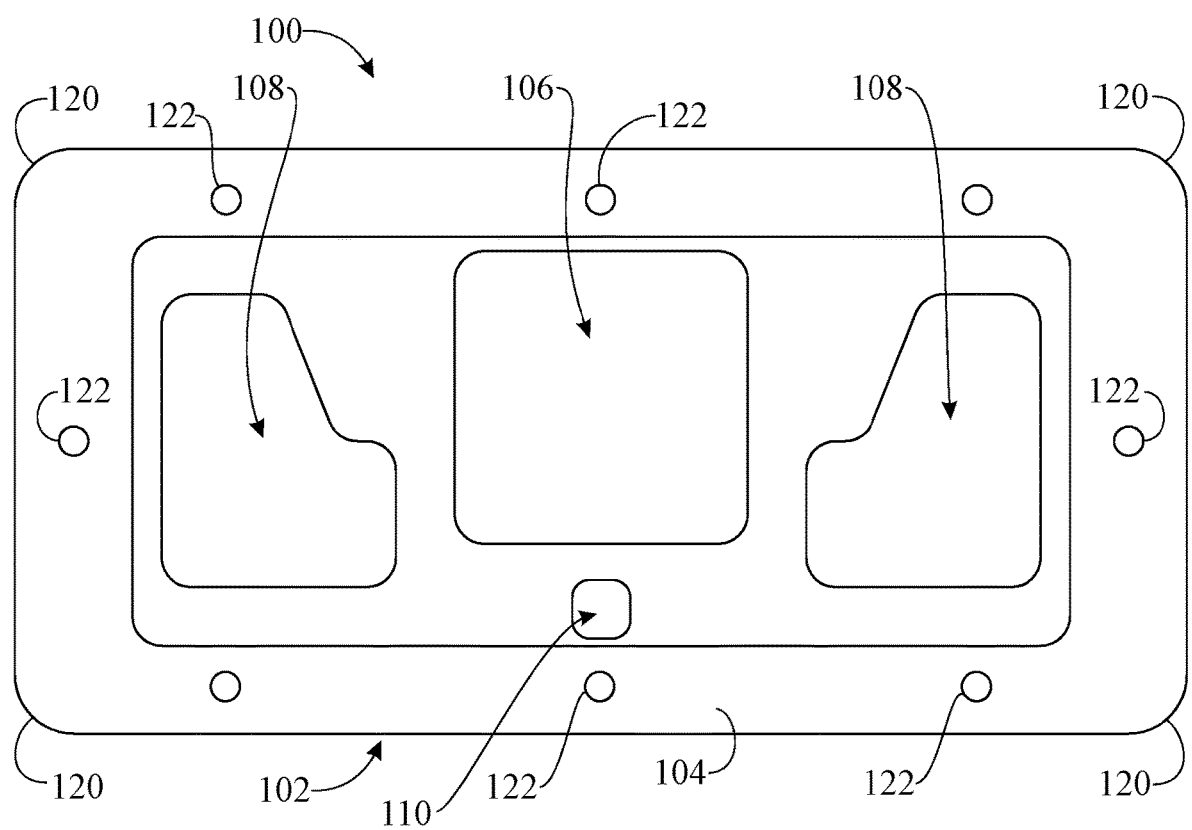
FIG. 2 presents a front elevation view of the license plate holder of in FIG. 1.

With reference to FIG. 1, the customizable license plate holder 100 may include a holder frame 102. The holder frame 102 may be fabricated of metal, plastic, composite material and/or other suitable material. The holder frame 102 may be generally elongated and rectangular and may include a front frame plate 104 and a rear frame plate 112. The rear frame plate 112 may be disposed in adjacent, parallel, spaced-apart relationship to the front frame plate 104. With continued reference to FIG. 1, a frame interior 118 may be formed by and between the front frame plate 104 and the rear frame plate 112. The frame interior 118 may be suitably sized and configured to accommodate the vehicle license plate 134. In some embodiments, the rear frame plate 112 may be formed separately to the front frame plate 104 and may be attached to the front frame plate 104 via one or more mechanical fasteners, one or more magnets, an adhesive, or other fastening means. In other embodiments, the rear frame plate 112 may be formed integrally with the front frame plate 104 such as by joint injection molding of the front and rear frame plates 104 and 112, with the frame interior 118 provided therebetween. In some embodiments, the rear frame plate 112 may be formed integrally with the front frame plate 104 at the respective frame corners 120 of the holder frame 102.

As further shown in FIG. 1, a license plate insertion space or slot 124 may be formed by and between the front frame plate 104 and the rear frame plate 112. The license plate insertion slot 124 may communicate with the frame interior 118. The license plate insertion slot 124 may be suitably sized and configured to allow the passing therethrough of the vehicle license plate 134 as the vehicle license plate 134 is placed into the frame interior 118, as illustrated in FIG. 3 and will be hereinafter described. In some embodiments, the license plate insertion slot 124 may be provided along the upper edge of the holder frame 102, as illustrated in FIGS. 1 and 3. Alternatively or additionally, one or more license plate insertion slots may be provided on the remaining sides of the holder frame 102. In some embodiments, a license plate insertion space or slot may not be provided on the bottom side of the holder frame 102, i.e. the bottom side of the holder frame 102 may be configured to retain the vehicle license plate 134 within the frame interior 118 by gravity and support the vehicle license plate 134.

With continued reference to FIG. 1, at least one plate opening or window 106, 108 may extend through at least the front frame plate 104. In some embodiments, a center plate window 106 and a pair of side plate windows 108 may extend through at least the front frame plate 104. The center plate window 106 may be generally rectangular or square-shaped with optional rounded corners, and each side plate window 108 may be generally "L"-shaped with optional rounded corners. A bottom plate window 110 may additionally extend through at least the front frame plate 104, beneath the center plate window 106. As illustrated in FIGS. 4 and 5, the center plate window 106 and the side plate windows 108 may be suitably positioned to facilitate exposure of the license plate indicia 136 on the vehicle license plate 134 through the center plate window 106 and side plate openings 108.

As further shown in FIG. 1, in some embodiments, at least one plate window 114, 116 may extend through the rear frame plate 112. Accordingly, a center plate window 114 and a pair of side plate windows 116 may extend through the rear frame plate 112. The center plate window 114 and the side plate windows 116 may register with the respective center plate window 106 and side plate windows 108 in the front frame plate 104 of the holder frame 102. This may allow, for instance, the customizable license plate holder 100 to be reversible in a front-to-back direction, such that either one of the front frame plate 104 or the rear frame plate 112 (each of which optionally provided with different decorative colors or distinguishing visible features) may be placed facing outwardly from the motor vehicle 140.

As illustrated in FIGS. 5 and 6, at least one decorative element 128 may be affixed to the front frame plate 104 of the holder frame 102 according to any suitable technique known by those skilled in the art. As illustrated in FIG. 5, in some embodiments, at least one decoration mount opening 122 may be provided in the front frame plate 104. The at least one decorative element 128 may detachably engage the at least one decoration mount opening 122. In some embodiments, a plurality of decoration mount openings 122 may be provided in the front frame plate 104 in any desired pattern. For example and without limitation, in some embodiments, the decoration mount openings 122 may be arranged around the perimeter of the holder frame 102, such as in equally spaced-apart relationship to each other. The decorative elements 128 may detachably engage the respective decoration mount openings 122 by a mechanical or magnetic attachment which allows the decorative elements 128 to detach from the holder frame 102. For example and without limitation, in some embodiments, each decorative element 128 may include a decoration mount clip 130 which snaps into each corresponding decoration mount opening 122.

In some embodiments, the rear frame plate 112 may be provided with one or more decoration mount openings similar or identical to the decoration mount openings 122 of the front frame plate 104. This will allow assembling the at least one decorative element 128 to the holder frame 102 when the holder frame 102 is attached to the motor vehicle 140 in a reversed position in which the front frame plate 104 is facing the motor vehicle 140 and the rear frame plate 112 is facing outwards.

Each decorative element 128 may be fabricated of plastic, metal and/or any other suitable material. In some embodiments, each decorative element 128 may be approximately 2 inches wide, for instance and without limitation. Each decorative element 128 may resemble an object or have any design which accords with the tastes and aesthetic preferences of the owner or driver of the motor vehicle 140. For example and without limitation, in various embodiments, the decorative elements 128 may include sports team related images, logos, pets or animal breeds or may represent groups, organizations, schools, activities, flags, hobbies, religions or special interests. In some embodiments, the decorative elements 128 may include charm-style decorations which may resemble the shape and appearance of basketballs, baseballs, footballs or football helmets, for example and without limitation.

As illustrated in FIGS. 3-6, in typical application of the customizable license plate holder 100, the vehicle license plate 134 may be inserted in the frame interior 118 of the holder frame 102 typically by inserting the vehicle license plate 134 through the top frame slot 124 (FIG. 3) or other available insertion slot(s). As illustrated in FIG. 5, the decorative elements 128 may be attached to the holder frame 102 typically by snapping the decoration mount clips 130 on the decorative elements 128 into the respective decoration mount openings 122 in the front frame plate 104. As illustrated in FIG. 6, the holder frame 102 may be mounted on the rear of a motor vehicle 140 using bolts, screws and/or other suitable mechanical fasteners (not illustrated). Accordingly, the decorative elements 128 reflect the tastes and aesthetic preferences of the owner or driver of the motor vehicle 140. The license plate indicia 136 on the vehicle license plate 134 are visible through the center plate window 106 and the side plate windows 108 in the front frame plate 104.

Figure 7:
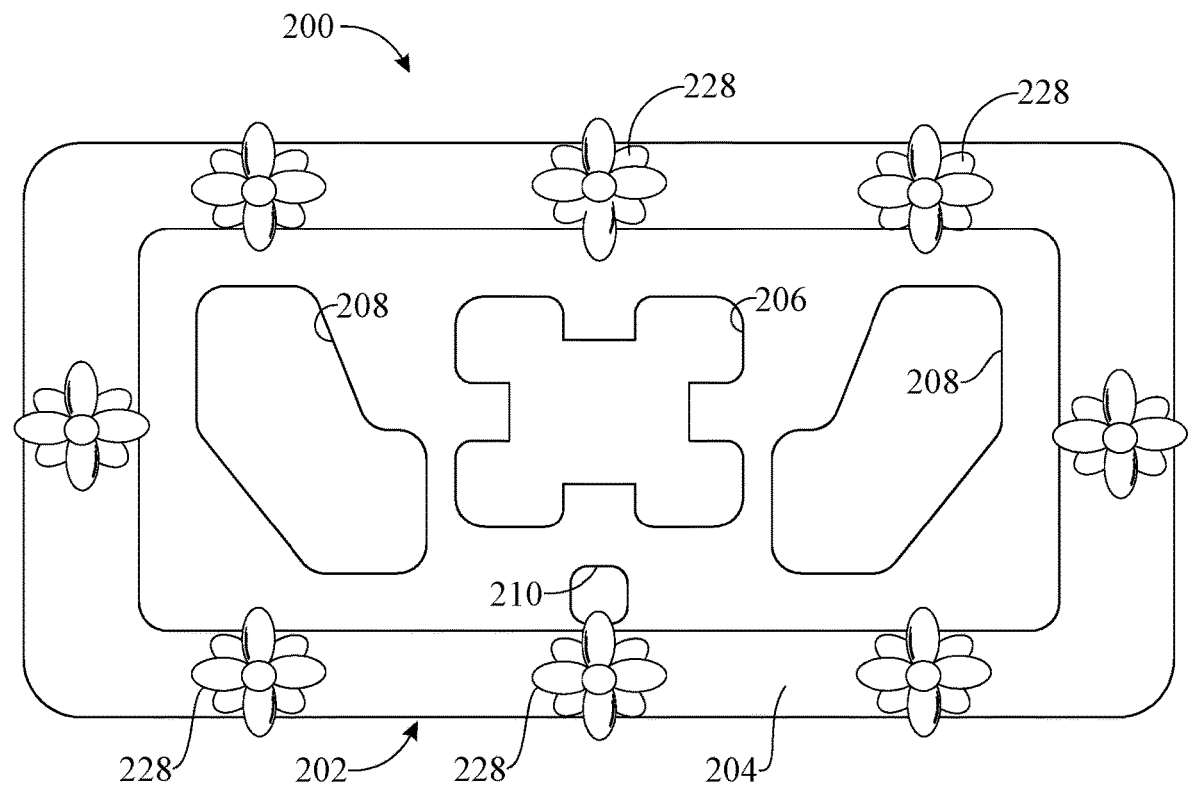
FIG. 7 presents a front elevation view showing a customizable license plate holder in accordance with a second illustrative embodiment of the present invention.

Referring next to FIG. 7 of the drawings, a second illustrative embodiment of the customizable license plate holder of the present invention is generally indicated by reference numeral 200. In the license plate holder 200, elements which are analogous to the respective elements of the customizable license plate holder 100 that was heretofore described with respect to FIGS. 1-6 are designated by the same respective reference numerals in the 200-299 series in FIG. 7. In the customizable license plate holder 200, the center plate window 206 may be generally X-shaped with optional rounded corners, and each side plate window 208 may be generally elongated and oblique, with optional rounded corners. Each decorative element 228 shown in the present drawing is provided in the shape and appearance of a flower, to illustrate the wide variety of decorative elements which may be carried by the customizable license plate holder of the present disclosure. Application of the customizable license plate holder 200 may be as was heretofore described with respect to the customizable license plate holder 100 in FIGS. 1-6.

Figure 8:
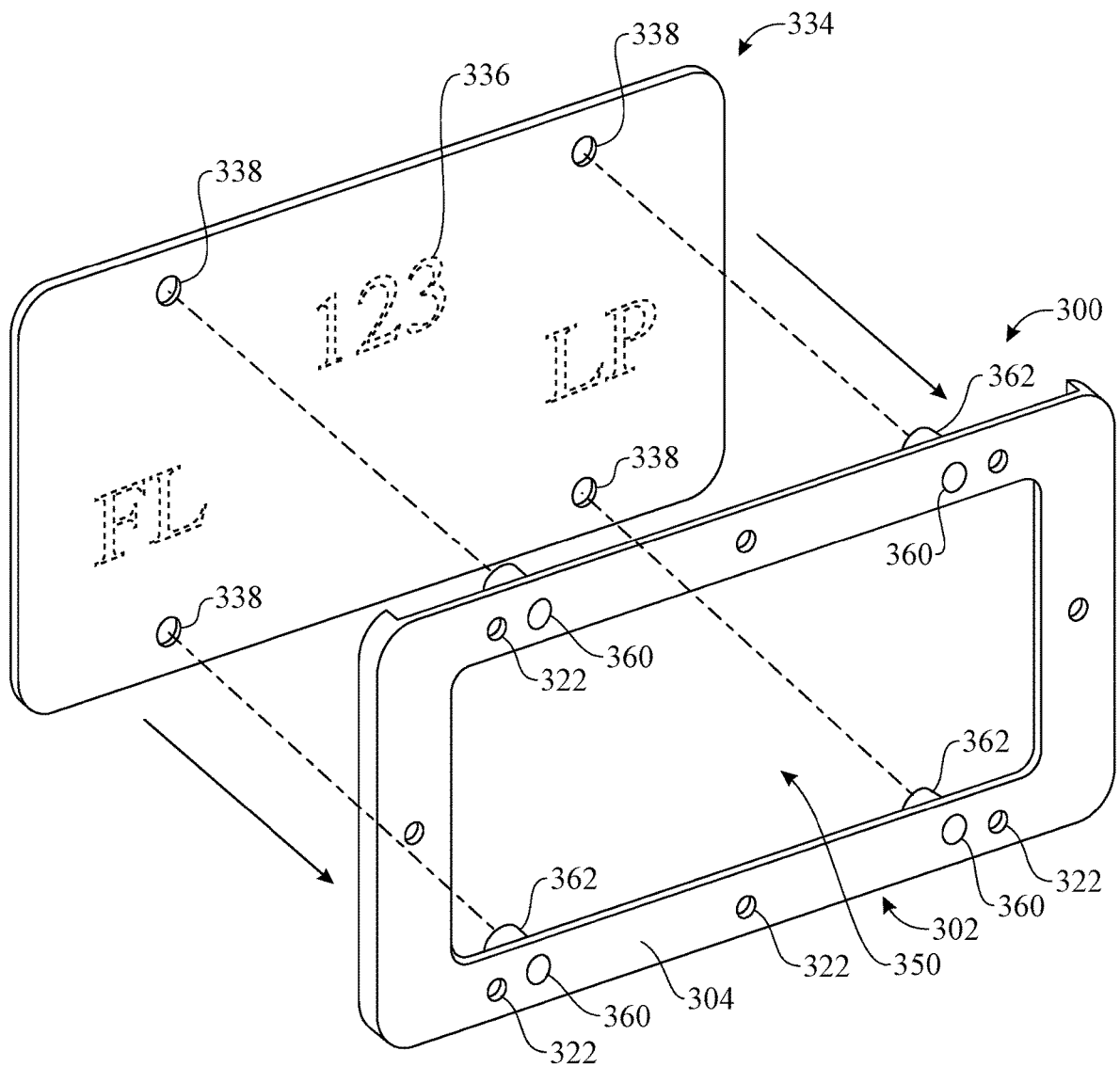
FIG. 8 presents a top front isometric view showing a customizable license plate holder in accordance with a third illustrative embodiment of the present invention, in the process of being attached to a vehicle license plate.
Figure 9:
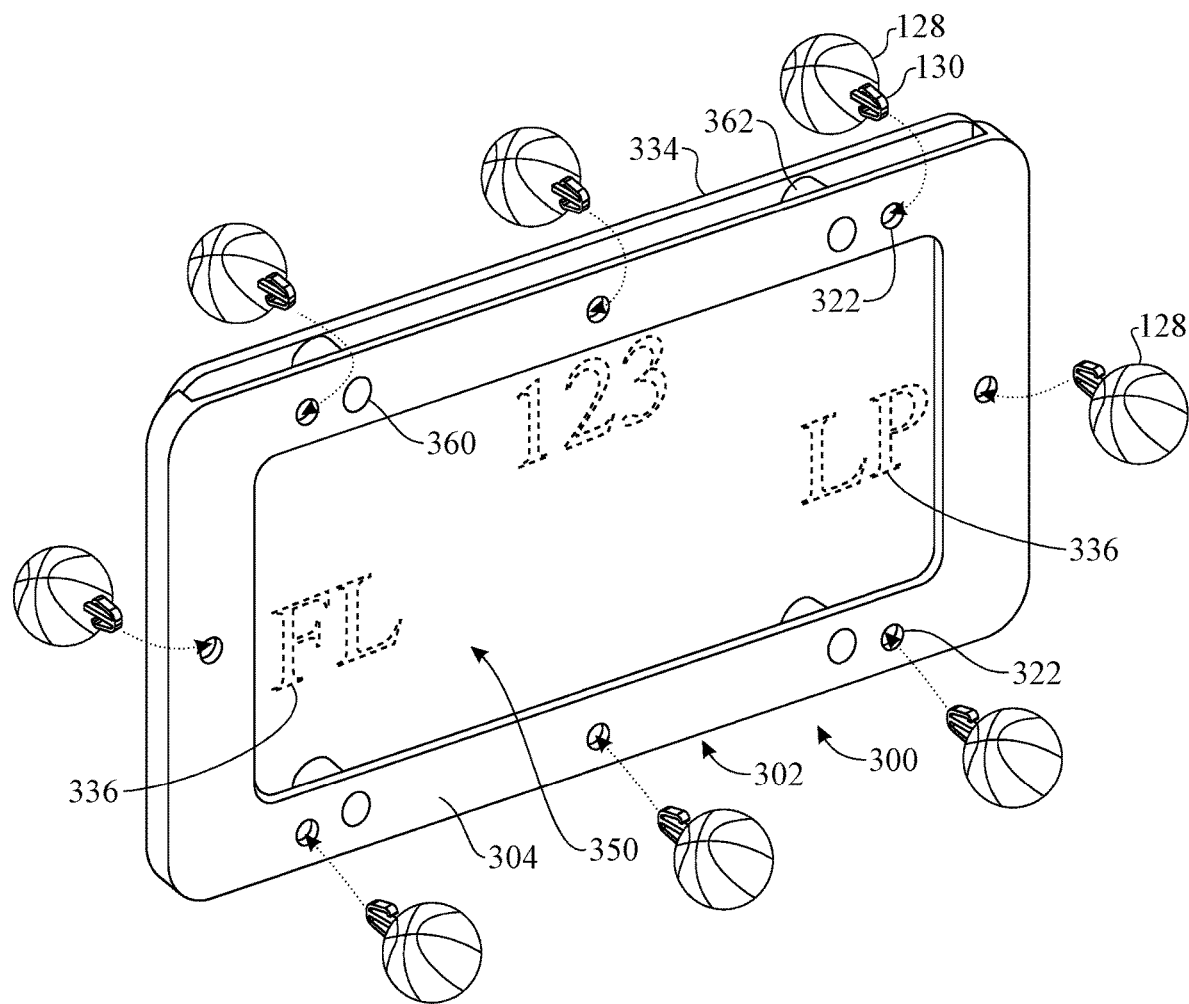
FIG. 9 presents a top front exploded isometric view of the license plate holder and license plate of FIG. 8, more particularly illustrating the vehicle license plate attached to the license plate holder and further illustrating typical attachment of decorative elements to the license plate holder.

The illustrations of FIGS. 8 through 11 show a customizable license plate holder 300 in accordance with a third illustrative embodiment of the invention. Like features of the customizable license plate holder 300 and the customizable license plate holder 100 (FIGS. 1 through 6) are numbered the same except preceded by the numeral '3'. Similarly to the first embodiment, the customizable license plate holder 300 of the present embodiment comprises a holder frame 302 having a front frame plate 304. However, unlike the first embodiment, the holder frame 302 of the present embodiment lacks a rear frame plate and the front frame plate 304 is configured to attach to a front side of a vehicle license plate 334. A further difference is that the front frame plate 304 comprises a single plate window 350 extending through the front frame plate 304 and configured to register with the license plate indicia 336 provided on the vehicle license plate 334, as best shown in FIGS. 8 and 9. The front frame plate 304 may be fabricated of metal, plastic, composite material and/or other suitable material. At least one decorative element 128 may be affixed to the front frame plate 304 of the holder frame 302 according to any suitable technique known by those skilled in the art such as, but not limited to, a decoration mount clip 130 configured to clip or snap into a corresponding decoration mount opening 322 formed in the front frame plate 304.

Figure 10:
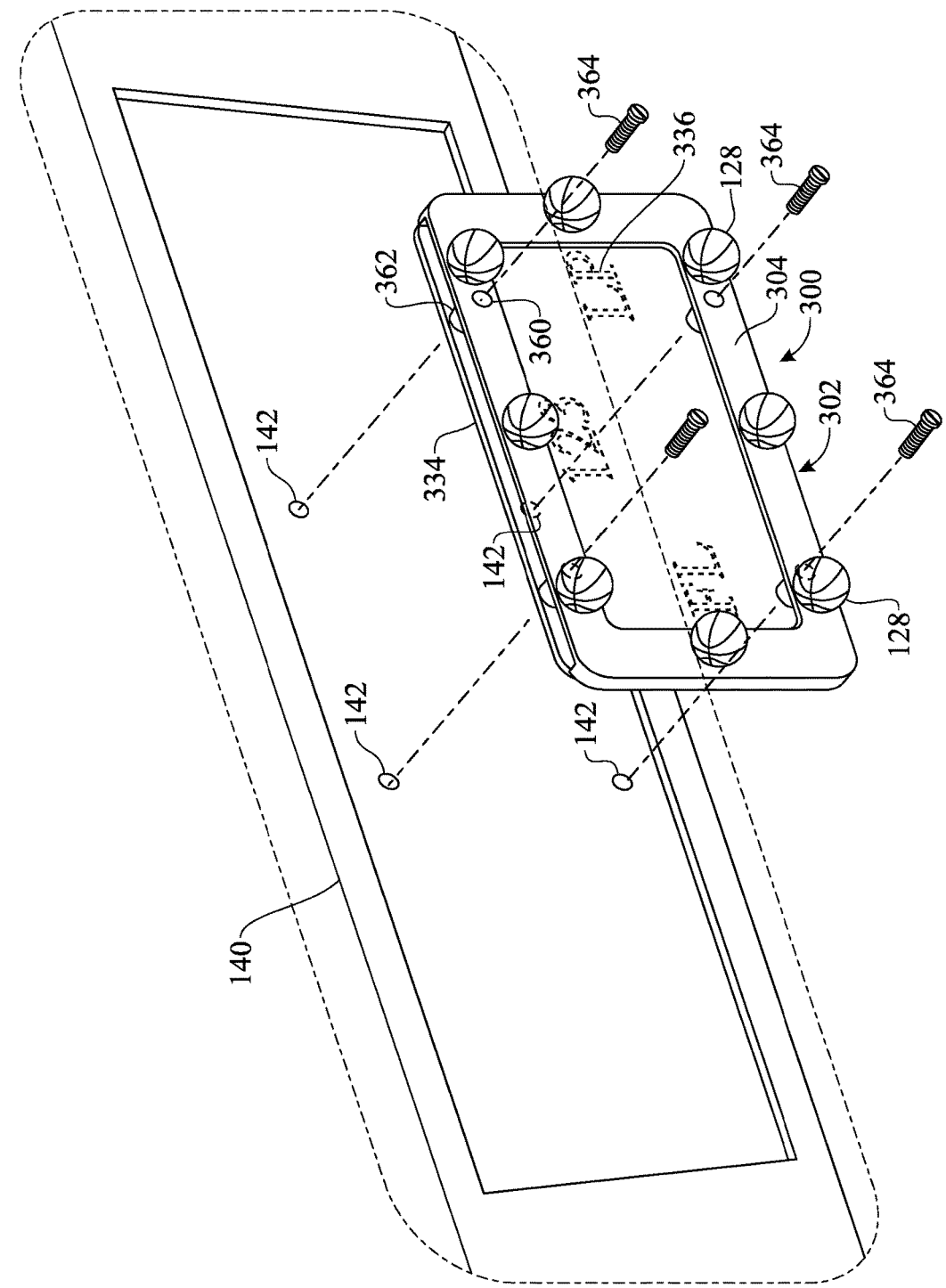
FIG. 10 presents a top front exploded isometric view of the assembly comprising the license plate holder, license plate and decorative elements of FIG. 9, illustrating typical attachment of the assembly to a motor vehicle.
Figure 11:
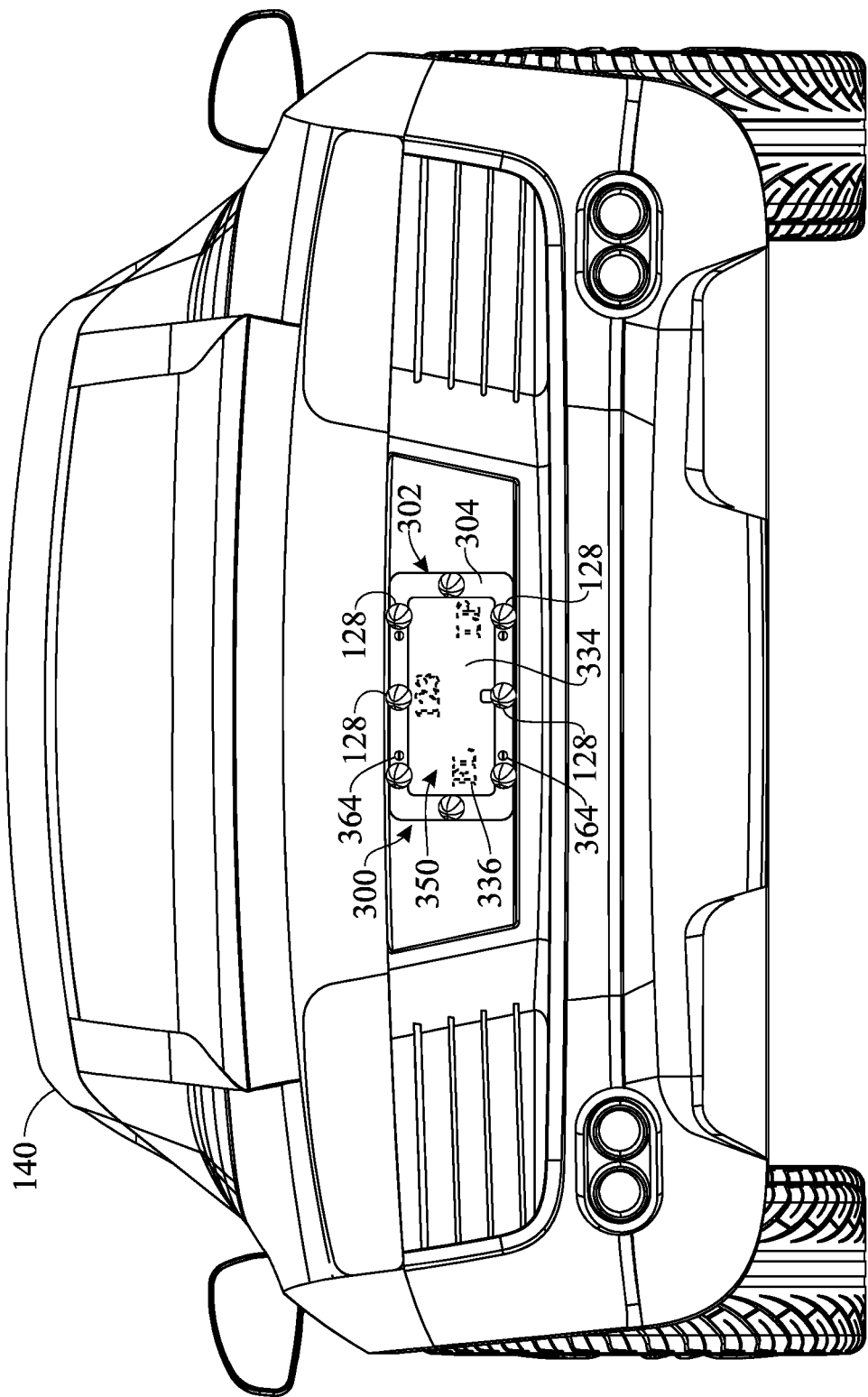
FIG. 11 presents an elevation view of the motor vehicle with the customizable license plate holder of FIG. 10 mounted on the rear end of the vehicle.

The front frame plate 304 further includes one or more through openings 360 configured to align with corresponding one or more openings 338 formed through the vehicle license plate 334. In some embodiments, the front frame plate 304 may feature one or more rear posts or columns 362 configured to rest on the vehicle license plate 344 and maintain the license plate 334 in a spaced-apart relationship with the front frame plate 304 as shown in FIG. 9. Each through opening 360 extends through a respective rear post or column 362. As shown in FIG. 10, the vehicle license plate 134 and customizable license plate holder 300 may be attached to the motor vehicle 140 by inserting a set of one or more fasteners 364 through the one or more through openings 360 in the front frame plate 304 and attaching the one or more fasteners 364 to one or more corresponding fastener-receiving bores 142 provided on the motor vehicle 140, such as a set of one or more fastener-receiving bores typically provided for the mounting of a vehicle license plate. The illustration of FIG. 11 shows the vehicle license plate 334 and customizable license plate holder 300 secured to the motor vehicle 140 by the one or more fasteners 364, while the license plate indicia 336 remains visible through the single plate window 350 unobstructed by the decorative elements 128 enhancing the holder frame 302.

It must be noted that the customizable license plate holder may carry identical decorative elements or different types of decorative elements, as desired by the user. For instance, a customizable license plate holder could carry a combination of the ball-shaped decorative elements 128 and flower-shaped decorative elements 228 disclosed herein.

Alternative embodiments are contemplated without departing from the scope of the present disclosure. For instance, the holder frame and/or decorative elements can be provided with lights, such as, but not limited to, one or more LED or neon lights.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A customizable license plate holder for a vehicle license plate, comprising:
   a holder frame made out of a rigid material securable to a vehicle, the holder frame configured to register with a vehicle license plate having license plate indicia, the holder frame comprising
   a front frame plate arrangeable in front of the vehicle license plate when the holder frame is secured to a vehicle, the front frame plate including at least two decoration mounting openings, and at least two openings configured to register with at least two openings formed in the vehicle for the insertion of at least two respective fasteners therethrough to secure the holder frame to the vehicle,
   a frame interior configured to removably receive the vehicle license plate, and at least two plate windows are configured to register with the license plate indicia on the vehicle license plate when the vehicle license plate is received in the frame interior,
   a rear frame plate including at least two decoration mount openings aligned with the at least two decorative mounting opening on the front frame plate, wherein each of at least two decorative elements detachably engages the aligned decorative openings in the front and rear frame plate,
   wherein the frame interior is formed by and between the front frame plate and the rear frame plate, and
   wherein the at least two decorative element comprises a decoration mount clip which snaps into the aligned decoration mount openings in the front and rear frame plates;
   wherein one of the least two plate windows is provided adjacent the rear frame plate and the other of the least two plate windows is provided adjacent the front frame plate; and
   wherein the holder frame is reversibly securable to the vehicle, such that the holder frame is mountable in a first orientation with the front frame plate oriented outwards of the vehicle and the rear frame plate oriented towards the vehicle, and an opposite, second orientation with the front frame plate oriented towards the vehicle and the rear frame plate oriented outwards of the vehicle.

2. The customizable license plate holder of claim 1, wherein one or more plate windows of the at least two plate window are provided in the front frame plate.

3. The customizable license plate holder of claim 1, wherein at least one of the at least two plate windows comprises a center plate window and a pair of side plate windows.

4. The customizable license plate holder of claim 1, wherein at least one of the at least two plate window comprises two or more plate windows having different sizes and/or shapes.

5. The customizable license plate holder of claim 1, wherein a diameter or width of each of the at least two decorative element is approximately 2 inches.

6. The customizable license plate holder of claim 1, wherein the at least two decorative element are removably affixed to the holder frame around the perimeter of the holder frame.

\* \* \* \* \*